3,304,618
METHOD OF STABILIZING CRYSTALS

James J. Leddy and Dale L. Schechter, Midland, Mich., assignors to The Dow Chemical Company, Midland, Mich., a corporation of Delaware
No Drawing. Filed Jan. 21, 1964, Ser. No. 339,093
4 Claims. (Cl. 34—9)

This invention relates to the stabilization of crystalline materials and more particularly relates to a novel method of stabilizing crystals of sodium peroxide octahydrate.

Various materials which are known to be unstable tend to decompose over varying periods of time. For example, though ordinary commercial anhydrous sodium peroxide is quite stable, the octahydrate thereof tends to be quite unstable due surprisingly, it has been found, apparently to the presence of surface water on the octahydrate crystal. A method, therefore, whereby decomposition of such unstable crystals could be minimized would be highly desirable in the art.

The term "surface water" as used herein refers to uncombined free or sorbed water present essentially on the surface of the crystal to be treated as opposed to any combined waters of hydration in the crystal lattice.

The term "unstable" as used herein refers to the phenomenon of chemical degradation or change in structure of a crystalline material. Accordingly, the term "stabilizer" or "stabilizing" refers to the maintenance of a given crystalline material in a form wherein it does not undergo detrimental auto-chemical reaction or degradation.

A principal object of the present invention is to provide a novel method whereby decomposition of crystals which are rendered unstable by the presence of surface water can be minimized.

A further object is to provide a novel method of stabilizing crystals of sodium peroxide octahydrate to substantially reduce auto-decomposition and peroxygen value loss of said hydrate upon standing or storage.

These and other objects and advantages have been found obtainable in general by contacting crystals of a material which has been found to decompose primarily due to the presence of surface water thereon, such as, for example, sodium peroxide octahydrate, with a desiccating solvent as a stabilizing agent, for example, diethyl ether, which is nonreactive with the crystals to be treated, thereby to remove an amount of said surface water sufficient to render said crystals substantially more stable than the untreated crystals.

Accordingly, the present novel method of stabilizing crystals to substantially minimize auto-decomposition of crystalline materials due apparently to the presence thereon of surface water comprises the steps of, contacting said crystals to be treated with a water sorbing solvent in an amount sufficient to reduce the surface water to a level, whereby the maximum possible stability of the crystal under this condition is obtained, then separating the so-contacted crystals as, for example, by filtration, followed by drying the crystals for subsequent use or storage.

In general, the solvent must be one inert with respect to reaction with the material to be stabilized, including the impurities therein, such as, for example in the octahydrate aforesaid, sodium hydroxide which is normally an impurity existing in said octahydrate. In addition, the solvent must be one in which water is at least partially soluble, and preferably only slightly when the crystals to be treated are hydrates, such as sodium peroxide octahydrate, so as not to possess such a strong affinity for water as to remove water of hydration. Suitable solvents for use in the present invention include, in addition to the diethyl ether stabilizer as described above, dioxane, tetrahydrofuran, acetonitrile, ethyl bromide, isopropyl ether and chloroform.

After contacting the crystals to be treated or stabilized with the solvent the damp crystals, now essentially free of surface water, are then dried as, for example, on a fritted funnel by passing a steady stream of well dried carbon dioxide-free air or argon up through the frit, whereupon the crystals are then, if stored, preferably placed in a closed container.

Contact time of the solvent with the crystals in order to remove enough surface water to attain maximum crystal stability is not otherwise critical and may vary from a few seconds to several minutes or more until the surface water on the crystal equilibrates with that in the solvent depending on the crystal and size thereof to be treated, the solvent used, and degree of agitation during contact.

Of the aforesaid solvents diethyl ether, dioxane, tetrahydrofuran and acetonitrile are preferred for use in the present process particularly when hydrates such as sodium peroxide octahydrate are being treated, diethyl ether being most preferred. With respect to $Na_2O_2 \cdot 8H_2O$ it has been found that the surface water is preferably reduced to a level of about 0.5 mg. per gram of crystals using ether. Such levels for other crystalline materials whereby greater stability is attained is readily determined by one skilled in the art.

It should be understood that any particular theory or mechanism of operation made herein with respect to the basis on which the present invention rests is not to be construed or intended to be binding and is merely an explanation to that affect.

The following examples serve to more fully illustrate the present invention but are not intended to be limited thereto.

Example 1

A batch of sodium peroxide octahydrate crystals was wetted with water then dried by blowing a stream of dry air up through the frit of a funnel containing the batch for about 30 minutes. After being so-dried the surface water content thereof was spectrophotometrically calculated to be about 16 mgs. per gram of crystals. From the batch was extracted two samples, one designated A and weighing 10.35 grams and the other weighing 10.39 grams designated B. Sample A was placed in an ampoule of known volume which was attached to a mercury capillary manometer, the ampoule-manometer combination being referred to herein as a decomposimeter, whereupon, the daily change in pressure due to oxygen liberation was recorded and the decomposition per month calculated therefrom. Sample B on the other hand was first contacted with a sufficient amount of diethyl ether to lower the surface water content to about 0.5 mg. per gram of crystals. Thereafter the ether-dried crystals were also put in a decompositer and the daily change in pressure recorded and the decomposition per month calculated. Sample A, it was found, decomposed at a monthly rate of about 15.6 percent, whereas, Sample B upon being treated in accordance with the present invention was found to decompose only at a rate of about 6.6 percent per month, representing a substantial reduction in the decomposition rate in Sample B as compared to that of Sample A of about 58 percent.

Example 2

From another batch of damp octahydrate crystals containing about 20 mg. of surface water per gram of crystals two samples designated A and B were obtained and processed similarly to the corresponding Samples A and B of Example 1. Again Sample A, which had not been processed in accordance with the present invention showed a much higher monthly decomposition rate, namely 18.9 percent, than Sample B which had been contacted with diethyl ether to reduce the surface water level to 0.5 mg. per gram of crystals showing a decomposition rate of 6.85 percent.

Various modifications can be made in the present invention without departing from the spirit or scope thereof and it is understood that we limit ourselves only as defined in the appended claims.

We claim:

1. A method of stabilizing sodium peroxide octahydrate crystals having surface water thereon which comprises, contacting said crystals with an effective amount of a water sorbing solvent to reduce the surface water to a level whereby maximum crystal stability is attained, and separating the solvent from the crystals.

2. The method of claim 1 wherein the solvent employed is one selected from the group consisting of diethyl ether, dioxane, tetrahydrofuran, acetonitrile, ethyl bromide, isopropyl ether, chloroform and mixtures thereof.

3. The method of claim 1 wherein the solvent is diethyl ether.

4. The method of claim 1 wherein the surface water on the octahydrate crystals is reduced to a level of about 0.5 mg. per gram of crystals.

References Cited by the Examiner

UNITED STATES PATENTS

| | | | |
|---|---|---|---|
| 1,354,279 | 9/1920 | Browne | 34—36 X |
| 2,155,704 | 4/1939 | Goodall et al. | 23—184 X |
| 2,553,239 | 5/1951 | Christiansen | 34—9 X |
| 3,053,633 | 9/1962 | Dunlop et al. | 23—184 |
| 3,094,431 | 6/1963 | Goldstein et al. | 34—36 |

FREDERICK L. MATTESON, Jr., *Primary Examiner.*
JOHN J. CAMBY, *Examiner.*
D. A. TAMBURRO, *Assistant Examiner.*